United States Patent Office 3,351,677
Patented Nov. 7, 1967

3,351,677
CHLORINATED POLYETHYLENE ELASTOMERS
Oliver A. Barton, Florham Park, and Edward W. Pietrusza, Morristown, N.J., assignors to Allied Chemical Corporation, New York, N.Y., a corporation of New York
No Drawing. Filed Apr. 13, 1964, Ser. No. 359,497
1 Claim. (Cl. 260—889)

ABSTRACT OF THE DISCLOSURE

This specification discloses an elastomeric composition having good processability and excellent elastic recovery which comprises a covulcanized blend of an amorphous, very high molecular weight, e.g., over about 700,000, chlorinated polyethylene containing from about 25% to about 35% by weight of chlorine and from about 25% to about 75% by weight of said chlorinated polyethylene of another chlorinated polymer which can be either polychloroprene or chlorosulfonated polyethylene.

---

Chlorinated linear polyethylene, containing about 25 to about 35% by weight of chlorine; having a glass transition temperature of not greater than −10° C.; having an intrinsic viscosity from about 3.0 to about 4.5 dl./gm. in o-dichlorobenzene at 100° C.; and having a crystallinity of no greater than 1% as determined by the substantial absence of an endothermal differential thermal analysis peak at about the melting point of the parent polyethylene (hereinafter also referred to as "chlorinated high molecular weight polyethylene"), can be formulated and vulcanized into elastomers having mechanical and environmental properties which are either superior or substantially equal to synthetic and natural rubbers produced commercially. With the demand for total rubber consumption in the world in 1963 being approximately 3,200,000 tons, there is unquestionably a need for commercially acceptable elastomers which have properties substantially equal or superior to elastomers presently on the world market, but can be produced at a much lower price. The properties of the chlorinated high molecular weight polyethylene which are superior or substantially equal to commercial synthetic or natural rubbers are tensile strength, flexibility, resistance to impact and tear, chemical inertness, e.g., resistance to mineral acids, bases, oils, hardness, embrittlement temperature, low temperature resistance, durability, resistance to flame, ozone, heat, and light, waterproofness, and rotproofness.

Two drawbacks have been found, however, which have heretofore impeded the described chlorinated high molecular weight polyethylene from entering into commercial competition with the synthetic and natural rubbers in current use.

One drawback resides in elastic recovery, i.e., the degree to which an elastomeric compound subjected to applied stress will return to its original shape when the stress is released. This property can be tested by the application of the procedure outlined under ASTM designation: D 412–62T (revised 1962).

The other drawback is in processability during compounding which is measured by Mooney viscosity. The method of measurement is the procedure outlined under ASTM designation: D 1646–61 (adopted 1961). In order to solve the problem of processability the addition of conventional plasticizers such as dioctyl phthalate and dibutyl phthalate has been suggested. These plasticizers are not only inadequate in improving the processability of the chlorinated high molecular weight polyethylene, but are so detrimental to the elastomeric properties as to render the chlorinated high molecular weight polyethylene substantially inferior to commercial synthetic and natural rubbers.

An object of this invention is to provide a new and useful vulcanized elastomeric chlorinated high molecular weight polyethylene composition having improved elastic recovery and processability. Other objects and advantages will become apparent hereinafter.

In accordance with the invention, a covulcanized elastomeric composition has been found comprising:
(a) Chlorinated linear polyethylene containing about 25% to about 35% by weight of chlorine, said polyethylene having a glass transition temperature of no greater than −10° C.; having an intrinsic viscosity from about 3 to about 4.5 dl./gm. in o-dichlorobenzene at 100° C.; and having a crystallinity of no greater than 1% as determined by the substantial absence of an endothermal differential thermal analysis peak at about the melting point of the parent polyethylene;
(b) A chlorinated hydrocarbon selected from the group consisting of polychloroprene and chlorosulfonated polyethylene; and
(c) A curing agent.

It has been unexpectedly found that this novel composition opens the gateway to a new series of synthetic rubbers in view of the dramatic improvement of the elastic recovery of the chlorinated high molecular weight polyethylene and its now satisfactory processability.

The term intrinsic viscosity is defined as the limit, at infinite dilution, of specific viscosity divided by concentration expressed in grams of resin per deciliter of solution. Specific viscosity is measured as effluent time for a given quantity of polymer solution from a standard pipet minus effluent time for an equal quantity of pure solvent, the remainder of the two effluent time quantities being divided by the effluent time for an equal quantity of pure solvent. Intrinsic viscosity can be determined, accordingly, by plotting the specific viscosity divided by concentration against concentration, using low concentrations, and extrapolating the resulting curve to zero concentration. The intrinsic viscosities reported herein are determined in accordance with ASTM Test D–1601–61, the units thereof being deciliters per gram (dl./gm.).

The term "glass transition temperature," a second order transistion temperature, can be determined by plotting the stiffness modulus of a sample of material as a function of temperature, and can be defined as a temperature at which the stiffness modulus of the sample possesses a value of $1.45 \times 10^4$ p.s.i. or $10^9$ dynes/cm.$^2$. The determination can be made in accordance with ASTM Test D–1043–61T. In effect, the glass transition temperature is that below which the chlorinated polymers became brittle. Above the glass transition temperature the polymers become more flexible and rubbery.

Crystallinity is determined by differential thermal analysis which is defined in the copending application of Carl R. Eckardt and William M. Bungo, Ser. No. 354,345, filed March 24, 1964.

Polychloroprene includes polymers of 2-chlorobutadiene 1,3, which are commonly known as neoprenes. Chlorosulfonated polyethylenes are commercially sold under the trademark "Hypalon." It is generally prepared by treating polyethylene in solution with chlorine and sulfur dioxide.

The curing (or vulcanizing) agents used are conventional. Examples are "Trimene Base," which is the trademark for the reaction product of ethyl chloride, formaldehyde, and ammonia; tetraethylene pentamine; triethylene tetramine; hexamethylene diamine carbamate; dicumyl peroxide; sulfur; and magnesium oxide.

Curing accelerators are preferably used alone or in combination in the vulcanization process. Examples are zinc oxide; zinc salts of 2-mercaptobenzothiazole;

"Tetrone" A (dipentamethylenethiuramtetrasulfide); "Na–22" (2-mercaptoimidazoline); 2 - mercaptobenzothiazole; guanadines such as diphenyl guanadine; and tetraethyl or tetramethylthiuram disulfides.

A small amount of lubricant, such as stearic acid, may be used but is unnecessary.

The vulcanized chlorinated polyethylene composition of this invention can be prepared by conventional vulcanizing methods. A typical and generalized vulcanizing method is accomplished by adding about 25 to about 75 parts by weight and preferably about 25 to about 50 parts by weight of chlorinated high molecular weight polyethylene by itself or, as called for in this invention, with the additive elastomer, i.e., either polychloroprene or chlorosulfonated polyethylene to a standard two-roll rubber mill. The weight ratio of chlorinated high molecular weight polyethylene to additive elastomer can range from about 3 to about 1 parts by weight of chlorinated high molecular weight polyethylene to 1 part of additive elastomer and, preferably, from about 2:1 to 1:1. About 2 to about 8 parts by weight of curing agent are then added to the polymer composition. A curing accelerator is also desirably included in the mixture in an amount of about 0.2 to about 2 parts by weight. Mixing is continued for several minutes and the stock is cut, folded, and "end passed" through the mill several times to insure a uniform distribution of components. The stock is desirably regulated at a temperature of below about 45° C. on the rolls to avoid excessive heat build-up and scorching. After milling, the stock is then formed into sheets, typically .075 inch thick and the sheets may then be cut into slabs, typically 6 x 6 inches. The sheets or slabs are then inserted into a mold and placed in a press where curing is effected at pressures of about 300 to about 1000 p.s.i. and preferably about 450 to about 550 p.s.i.; at a temperature of about 140° C. to about 180° C., and preferably about 150° C. to about 170° C.; for a period of time ranging from about 30 to about 2.5 minutes, and preferably from about 30 to about 10 minutes. The slabs are then hot stripped from the mold and chilled immediately in cold water.

The vulcanized elastomeric chlorinated polyethylene composition of this invention finds utility as a general substitute for natural and synthetic rubbers and more particularly as a substitute for neoprene, e.g., in gaskets, hose, belting, and lining, and as an elastomeric fiber for use in the textile industry.

The chlorinated high molecular weight polyethylene can be produced by various processes such as one described in the copending application of Carl R. Eckardt et al., filed March 24, 1964, Serial No. 354,345, referred to above, and another process which was used to provide the chlorinated high molecular weight polyethylene employed in the following examples. The latter process is described, generally, as follows:

The chlorinated high molecular weight polyethylene was derived by chlorination from a high specific substantially linear, high density polyethylene which is of ultra high molecular weight. This polyethylene is desirably produced by gas phase polymerization of ethylene over a porous frangible catalyst composed of a chromium containing material on a support of the group consisting of silica and silica-alumina. Suitable linear, high molecular weight polyethylene which may also be characterized as having long chain branches is produced, as described in British Patent 858,674 of January 11, 1961 to Allied Chemical Corporation, by gas phase polymerization of anhydrous, oxygen-free ethylene below the softening point of the polyethylene over a porous, frangible catalyst of an inorganic compound of chromium and oxygen and an active metal alkyl. The polyethylene produced thereby contain residue of the chromium silica catalyst systems dispersed throughout the polyethylene in an amount of at least about .001% and, usually .001 to .002%, by weight. Prior to chlorination the polyethylene from which the chlorinated polyethylene is derived has a density between about 0.935 and about 0.985 and a crystallinity of at least 75%, and customarily in the range of 75% to 85%, as determined, for example, by differential thermal analysis. The preferred polyethylenes produced in accordance with British Patent 858,-674 are of ultra weight average molecular weight between about 700,000 and about 5.0 million corresponding to an intrinsic viscosity between about 6 to 15 in decalin at 135° C., as calculated according to the method of P. S. Francis et al. from the viscosity of about 0.05 to 0.1 gram per 100 cc. solution in decalin using the equation:

$$n = 6.77 \times 10^{-4} M^{0.67}$$

where $n$=intrinsic viscosity and $M$=average molecular weight. (J. Polymer Science vol. 31, pp. 453–466, September 1958.)

The preparation of the chlorinated high molecular weight polyethylene for use in the composition of the invention, can be accomplished by two-stage suspension chlorination of the low pressure, ultra high molecular weight polyethylene with first-stage chlorination being carried out in aqueous slurry at a temperature below the crystalline melting point of the ethylene polymer, preferably at a temperature of about 60° C. to about 130° C., and desirably at about 90° C. to about 110° C., until at least about 5 percent, preferably about 5 to 17 percent, of chlorine has been introduced into the polymer. In the second-stage the chlorination is continued in the aqueous slurry at a temperature maintained above the crystalline melting point of the polymer but below the softening point of the chlorinated outer coating of such polymer until the desired chlorine is added. Second-stage chlorination temperatures are maintained above about 135° C. and preferably lie in the range of about 135° C. to about 150° C. If desired, chlorination in the second-stage may be carried out at temperatures above the crystalline melting point of the polymer for time sufficient to add at least about 5 to about 10 percent chlorine by weight, preferably until at least a total of 25 percent chlorine is added to the polymer, and the chlorination then continued at a lower temperature, e.g. 110° C. to 120° C., until the desired total chlorine is added. The chlorinated high molecular weight polyethylenes having less than 1% crystallinity and an intrinsic viscosity of at least 3 up to about 4.5 in a 0.5% solution of o-dichlorobenzene at 100° C. can be readily prepared from the polyethylenes of about 700,000 to about 5 million molecular weight by the above staged chlorination process.

The following examples in which parts and percentages are by weight are illustrative of the invention:

*Example I*

The chlorinated high molecular weight polyethylene having a chlorine content of about 30% and an intrinsic viscosity of about 4.0 in a 0.5% solution of o-dichlorobenzene at 100° C. was prepared by staged aqueous slurry chlorination of high molecular weight polyethylene having an average molecular weight of about 1,500,000 and a density of 0.94. Chlorination in the first stage was carried out at about 90° C. until about 17% chlorine was added to the ethylene polymer followed by second-stage chlorination at a temperature of 140° C. until about 30% chlorine was added. The high molecular weight polyethylene employed was prepared in accordance with British Patent 858,674 by gas phase polymerization of anhydrous oxygen-free ethylene over a catalyst of magnesium dichromate on a porous support of about 90% silica and 10% alumina. The chlorinated high molecular weight polyethylene had a glass transition temperature of about −23° C. (ASTM D–1043–61T), and crystallinity not greater than 1% as measured by differential thermal analysis.

The chlorinated high molecular weight polyethylene was then compounded on a standard two-roll rubber mill. To 100 parts of the resin there was first added 1 part of stearic acid as a lubricant. The stock was then allowed to mix on the mill for about two minutes and there was then added about 6 parts of "Trimene Base," a polyfunctional aliphatic amine comprising the reaction product of ammonia, formaldehyde and ethyl chloride and supplied by the Naugatuck Chemical Division of U.S. Rubber Company, and about 1 part of sulfur. After an additional two minutes of mixing the stock was cut and folded five times from either end of the mixing roll and "end passed" through the mill ten times. During the entire mixing operation the stock was regulated at a temperature below about 45° C. on the rolls. The stock was then formed into sheets about 0.085" thick and these sheets were cut into 6" x 6" slabs. A Mooney viscosity number was determined on the slab specimens according to ASTM 1646-61. The cut slabs were then inserted into a mold and placed in a press where the slabs were cured at a pressure of about 500 p.s.i. and at a temperature of about 150° C. for a period of about 30 minutes. Each of the slabs was hot-stripped from the mold and chilled immediately in cold water. The product elastomer was tested to determine degree of vulcanization by placing a 0.2 gm. sample in a stainless steel screen within a "Soxhlet" extractor. The sample was extracted with o-dichlorobenzene for 6 hours at about 100° C. and then oven dried for 15 hours at 100° C. at 1 to 2 mm. pressure.

*Examples II–IV*

Cured elastomer compositions were also prepared in the same manner as in Example I as follows:

Twenty-five parts of Neoprene W, a general purpose polychloroprene elastomer having a chlorine content of 40%; a glass transition temperature of −50° C.; and an intrinsic viscosity of 1.10, were added to 75 parts of the chlorinated high molecular weight polyethylene prior to milling.

*Example III*

Fifty parts of Neoprene W, described in Example II, were added to 50 parts of the chlorinated high molecular weight polyethylene prior to milling.

*Example IV*

Fifty parts of Hypalon 40, a chlorosulfonated polyethylene elastomer having a chlorine content of 29% and an intrinsic viscosity of 1.01, were added to 50 parts of the chlorinated high molecular weight polyethylene prior to milling.

The advantageous results found by determining the elastic recovery of the vulcanized elastomers and the Mooney values of the unvulcanized compositions prepared in Examples I to IV are set forth in Table I below.

The elastic recovery values are brought to a point where they are substantially equal or superior to the general group of synthetic and natural commercial elastomers. As shown in Table I, the elastic recovery of the chlorinated high molecular weight polyethylene with the additive elastomer is improved several hundred percent over the chlorinated high molecular weight polyethylene without the additive elastomer, which, as heretofore stated, is both dramatic and unexpected.

The Mooney value of 168 or less illustrates that the additive elastomer has brought the chlorinated high molecular weight polyethylene to a satisfactory processability level.

TABLE I

| Ex. No. | Additive Elastomer | Weight Ratio of Chlorinated High Molecular Weight Polyethylene to Additive Elastomer | Mooney Value (determined prior to vulcanization) | Elastic Recovery (set at break-determined after vulcanization), percent |
| --- | --- | --- | --- | --- |
| I | No additive elastomer | | *>200 | 125 |
| II | Neoprene W | 75/25 | 162 | 40 |
| III | ....do.... | 50/50 | 150 | 25 |
| IV | Hypalon 40 | 50/50 | 168 | 10 |

*Unprocessable.

Additional advantages of the elastomeric composition of our invention show such composition to have a higher abrasion resistance than Neoprene W; a higher ozone resistance than Neoprene W; a hardness and tensile strength without the use of filler which is only achieved by Neoprene W with filler; and the elimination of the requirement of special compounding which is necessary for Hypalon 40.

We claim:

A covulcanized elastomeric composition comprising:
(a) chlorinated linear polyethylene containing about 25 to about 35% by weight of chlorine, said polyethylene having a glass transition temperature of no greater than −10° C.; having an intrinsic viscosity from about 3.0 to about 4.5 dl./gm. in o-dichlorobenzene at 100° C.; and having a crystallinity of no greater than 1% as determined by the substantial absence of an endothermal differential thermal analysis peak at about the melting point of the parent polyethylene, said parent polyethylene having a molecular weight of from 700,000 to about 5 million;
(b) a chlorinated hydrocarbon selected from the group consisting of polychloroprene and chlorosulfonated polyethylene, the ratio by weight of said chlorinated polyethylene to said chlorinated hydrocarbon being from about 3:1 to about 1:1; and
(c) a curing agent.

References Cited

UNITED STATES PATENTS

| | | | |
| --- | --- | --- | --- |
| 3,076,781 | 2/1963 | Frey | 260—889 |
| 3,223,675 | 12/1965 | Brackbill | 260—897 |
| 3,244,774 | 4/1966 | Kaupp et al. | 260—897 |
| 3,297,675 | 1/1967 | Fuhrmann | 260—94.9 |

MURRAY TILLMAN, *Primary Examiner.*

M. J. TULLY, *Assistant Examiner.*